Dec. 10, 1963   A. O. JANSSON   3,113,754
WIRING CLIP
Filed Sept. 18, 1962

Inventor:
Arnold O. Jansson,
by Walter S. Jones
Atty.

United States Patent Office 3,113,754
Patented Dec. 10, 1963

3,113,754
WIRING CLIP
Arnold O. Jansson, Arlington, Mass., assignor to United-Carr Fastener Corporation, Cambridge, Mass., a corporation of Delaware
Filed Sept. 18, 1962, Ser. No. 224,406
10 Claims. (Cl. 248—74)

The invention illustrated and described herein relates to a fastening device particularly useful for securing one or more wires, tubes, rods, or the like, or combinations thereof, to a suitable support.

An object of the invention is to provide a fastening device formed from synthetic molded plastic material in combination with a metal spring clip providng a novel construction.

Another object of the invention is to provide the fastening device with so-called plastic portion that is first molded as a unit and thereafter the metal clip (which has been made as a separate unit) is easily and quickly assembled therewith by a secondary operation.

A further object of the invention is to provide a fastening device wherein the main part of the device is of synthetic flexible molded material having a portion for holdng a wire, tube, rod, or the like, and an attaching portion to engage a support in combination with a spring metal attaching clip having support gripping teeth and a stabilizing spring finger.

Devices of the type illustrated heretofore have been formed entirely from synthetic plastic material but they have not been entirely satisfactory in use because they could not be strongly attached to a support, such as thin sheet metal, by a mere clip-on arrangement. Some such devices have been attached by a fastening means interlocking in a hole in a support. It is not believed that anyone has heretofore provided an all plastic device of the nature described and which has provided all of the advantages of an all plastic device or which could be securely attached to a flat surface support by the mere use of the clip arrangement and that could be attached securely against accidental pulling free from a support without the use of some additional fastening means.

Figure 2:
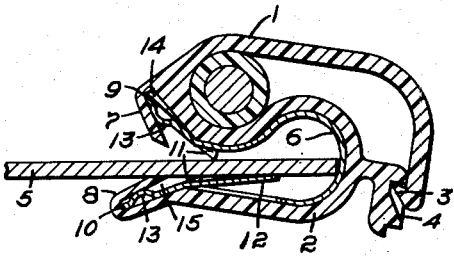
FIG. 2 is a section taken on the line 2—2 of FIG. 1.
Figure 3:
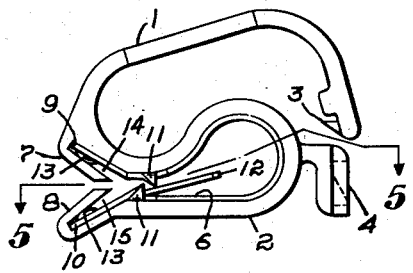
FIG. 3 is an edge view of the fastening device before attachment to a support and in open position.
Figure 4:
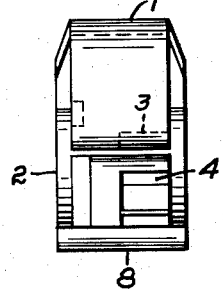
FIG. 4 is a view of the fastening device as viewed from the right of FIG. 3.

The device illustrated, and now to be described, provides for the advantages desired. This device has a one-piece molded construction made of synthetic plastic material that includes a wire, and the like, holding portion 1 and an attaching portion 2. In side elevation the device is generally S-shaped and the top portion is considered as the holding portion 1 and the bottom portion as the attaching portion 2, as illustrated in FIGS. 2 and 3. Both portions are clip-like in form and the middle of the S-shaped construction actually provides part of each.

The holding portion 1 may be of any suitable construction and such construction is not an important feature of the present invention. However, the particular construction illustrated includes a latching means in the form of inter-engaging hook-like portions 3 and 4 to provide for clamping a wire, rod, tube, or the like, firmly in position when inserted into the holding portion 1.

Figure 1:
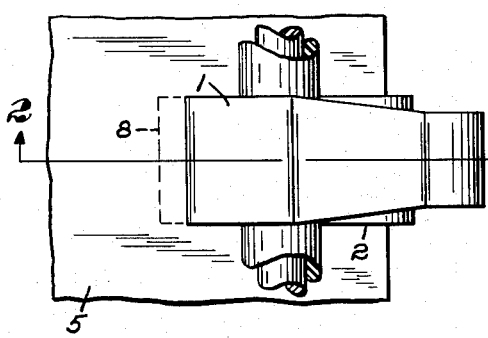
FIG. 1 is a plan view of a portion of the installation showing one use of the improved fastening clip device.

Attaching a portion 2, in and of itself as shown, is not satisfactory for holding the device to the thin support 5, shown in FIGS. 1 and 2, therefore, the improved device includes a spring metal clip 6 assembled within the attaching portion 2. This spring metal clip 6 is of the same general contour as the attaching portion 2 (FIGS. 2 and 3) and is held in assembly by the co-operating shapes of the two elements plus the overlapping portions 7 and 8 of the main plastic member which portions engage over free ends 9 and 10 of the clip 6.

Figure 5:
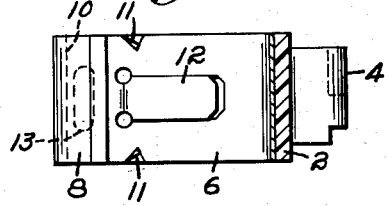
FIG. 5 is a section taken on the line 5—5 of FIG. 3.

A plain metal clip will assist in holding the device to a smooth surface support but it is preferred to increase the grip to the support by providing opposing sharp pointed teeth 11 (four in number) in pairs adjacent opposite edges of the clip 6, about as shown in FIGS. 2, 3, and 5. These teeth 11 bite into the support and hold the fastening device securely in position against accidental movement.

It has been found that the use of a spring finger 12, formed from the clip 6 (FIGS. 2 and 5) is useful as a stabilizing element to press upon the support and hold the device in a desired position against accidental swiveling action. Without this finger 12 there is tendency for the fastening device to pivot about the point where the teeth 11 contact the support 5 into an unsatisfactory relation to the support.

Rather than attempting to mold the metal clip into the molded plastic member during the operation, it has been found that a device may be less expensively constructed and more easily molded, to first mold the main part of the device and then assemble the metal clip 6 thereto by a relative edgewise movement of the parts until they have been nested. This operation may be accomplished by hand, by a kick press, or by suitable automatic assembly equipment as will be understood by anyone skilled in the assembly art. The parts are held together by friction and shape as is obvious from an inspection of the drawings. To increase the assembled efficiency and to take care of molding and spring forming tolerances each free end 9 and 10 of the arms of the clip 6 has an elongated boss portion 13 which, in effect, adds thickness to help the grip between the parts when the ends of the clip 6 are pressed into the grooves 14 and 15 as best shown in FIG. 2.

This new clip is strong, inexpensive to manufacture (as a two-piece device) and very efficient. It can be attached in a relatively fixed position upon a smooth surfaced support and it is relatively easy to apply by hand.

While there has been illustrated and described a preferred embodiment of the invention it should be understood that the invention is best defined by the following claims.

I claim:

1. A fastening device for holding wires, tubes, rods, or the like, in attached relation to a support, said fastening device having a spring metal clip for attaching it to a support and a holding portion formed of synthetic molded yieldable plastic material assembled with said clip.

2. A fastening device for holding wires, rods, or the like, in attached relation to a support, said fastening device having a spring metal clip for attaching it to a support, and a holding portion formed of synthetic molded yieldable plastic material and having a clip covering portion fitting over an outer surface of said clip, and assembled directly to said clip.

3. A fastening device for holding wires, tubes, rods, or the like, in attached relation to a support, said fastening device having a part formed of synthetic molded plastic material providing a holding portion and an attaching portion and a spring metal clip part assembled within the attaching portion to provide for a strong attachment of the fastening device to a support.

4. A fastening device for holding wires, tubes, rods, or the like, in attached relation to a support, said fastening device having a part formed of synthetic molded plastic material providing a holding portion and an attaching portion, a spring metal clip part assembled within the attaching portion to provide for a strong attachment of the fastening device to a support and said attaching portion having a transverse groove receiving a portion of said metal clip part to provide for assistance in holding the parts of the fastening device in assembly.

5. A fastening device for holding wires, tubes, rods, or the like, in attached relation to a support, said fastening device having a spring metal clip for attaching it to a support, a holding portion formed of synthetic molded yieldable plastic material assembled with said clip and a stabilizer spring finger provided as a part of said clip to co-operate with a support to help position said fastening device relative thereto.

6. A fastening device for holding wires, tubes, rods, or the like, in attached relation to a support, said fastening device having a spring metal clip for attaching it to a support, a holding portion formed of synthetic molded yieldable plastic material and having clip covering portion fitting over an outer surface of said clip, and assembled directly to said clip, and said clip having support engaging teeth for gripping a support and preventing accidental movement of said fastening device when attached to a support.

7. A fastening device for holding wires, tubes, rods or the like, in attached relation to a support, said fastening device having a part formed of synthetic molded plastic material providing a holding portion and an attaching portion and a spring metal clip part assembled within the attaching portion to provide for a strong attachment of the fastening device to a support, said clip part having opposed yieldable fingers connected at one end of the clip by a loop portion and having free ends overlapped on opposed sides by material of the attaching portion to assist in holding the clip in assembly with the attaching portion.

8. A fastening device for holding wires, tubes, rods, or the like, in attached relation to a support, said fastening device having a part formed of synthetic molded plastic material providing a holding portion and an attaching portion and a spring metal clip part assembled within the attaching portion to provide for a strong attachment of the fastening device to a support, said attaching portion having a transverse groove receiving a portion of said metal clip part to provide for assistance in holding the parts of the fastening device in assembly, and friction means provided by said clip and fitting into said groove to assist in holding the parts in assembly.

9. A fastening device for holding wires, tubes, rods, or the like, in attached relation to a support, said fastening device having a part formed of synthetic molded plastic material providing a holding portion and an attaching portion and a spring metal clip part assembled within the attaching portion to provide for a strong attachment of the fastening device to a support, said attaching portion having a transverse groove receiving a portion of said metal clip part to provide for assistance in holding the parts of the fastening device in assembly, friction means provided by said clip and fitting into said groove to assist in holding the parts in assembly and support gripping teeth provided by said metal clip part.

10. A fastening device for holding wires, tubes, rods, or the like, in attached relation to a support, said fastening device having a part formed of synthetic molded plastic material providing a holding portion and an attaching portion and a spring metal clip part assembled within the attaching portion to provide for a strong attachment of the fastening device to a support, said attaching portion having a transverse groove receiving portion of said metal clip part to provide for assistance in holding the parts of the fastening device in assembly, friction means provided by said clip and fitting into said groove to assist in holding the parts in assembly, support gripping teeth provided by said metal clip part and a stabilizing finger provided by said clip part to help position said fastening device relative to a support.

References Cited in the file of this patent
UNITED STATES PATENTS

| | | |
|---|---|---|
| 2,372,682 | Robertson | Apr. 3, 1945 |
| 2,372,683 | Robertson | Apr. 3, 1945 |
| 2,395,926 | Webb | Mar. 5, 1946 |
| 2,657,442 | Bedford | Nov. 3, 1953 |